United States Patent
Cox

(10) Patent No.: US 11,742,780 B2
(45) Date of Patent: Aug. 29, 2023

(54) GRAPHENE-ENHANCED TRIBOELECTRIC FOOTPATH ELECTRICITY GENERATOR FOR LARGE-SCALE OUTPUT PLANKS SUSPENDED BY RARE-EARTH METAL MAGNETS

(71) Applicant: Jacob Cox, Lexington, VA (US)

(72) Inventor: Jacob Cox, Lexington, VA (US)

(73) Assignee: Jacob Cox, Lexington, VA (US)

( * ) Notice: Subject to any disclaimer, the term of this patent is extended or adjusted under 35 U.S.C. 154(b) by 133 days.

(21) Appl. No.: 17/011,855

(22) Filed: Sep. 3, 2020

(65) Prior Publication Data

US 2021/0091683 A1 Mar. 25, 2021

Related U.S. Application Data

(60) Provisional application No. 62/904,275, filed on Sep. 23, 2019.

(51) Int. Cl.
| | |
|---|---|
| *H02N 1/04* | (2006.01) |
| *E04F 15/04* | (2006.01) |
| *H02N 15/00* | (2006.01) |

(52) U.S. Cl.
CPC ............. *H02N 1/04* (2013.01); *E04F 15/04* (2013.01); *H02N 15/00* (2013.01)

(58) Field of Classification Search
CPC .. H02N 1/00; H02N 1/04; H02N 2/18; H02N 1/006; H02N 15/00; E04F 15/04; B65H 3/16; F16C 32/04
USPC .................................................. 310/309, 310
See application file for complete search history.

(56) References Cited

U.S. PATENT DOCUMENTS

| | | | | |
|---|---|---|---|---|
| 2,014,033 | A * | 9/1935 | Smith .................... | B65D 1/023 |
| | | | | 215/41 |
| 10,211,758 | B2 * | 2/2019 | He .......................... | H02N 1/04 |
| 2017/0331397 | A1 * | 11/2017 | Kim ........................ | H02N 1/04 |
| 2019/0157992 | A1 * | 5/2019 | Mallineni ............... | H02J 50/40 |
| 2020/0161990 | A1 * | 5/2020 | Lin .......................... | H02N 1/04 |
| 2021/0091683 | A1 * | 3/2021 | Cox ........................ | H02N 1/04 |
| 2021/0119554 | A1 * | 4/2021 | Kim ........................ | H02N 1/04 |

* cited by examiner

*Primary Examiner* — Ahmed Elnakib

(57) ABSTRACT

The invention is comprised of individual planks with positively charged triboelectric pads attached, connected by copper strips and suspended by neodymuim magnets over a mirrored overlaying of planks, of the same length and width of the prior, with negatively charged triboelectric pads also connected by a copper strip. The overlayed planks stabilized by wood pegs.

1 Claim, 4 Drawing Sheets

GRAPHENE-ENHANCED TRIBOELECTRIC FOOTPATH ELECTRICITY GENERATOR FOR LARGE-SCALE OUTPUT PLANKS SUSPENDED BY RARE-EARTH METAL MAGNETS

BACKGROUND

Triboelectric generators (electricity from oppositely charged surface interaction and where energy output is surface area dependent) are currently an emerging technology primarily used on a small-scale for the charging of electronics i.e. watches and phones by kinetic energy from human movement for example a watch charger that produces 132 mW per at 8.4 square centimeters as shown in U.S. pat app Ser. No. 2014/0084784 A1. By extrapolating triboelectric material surface area to a larger scale, as shown in Gomes et al, arVix:1803.10070[comd-mat.mes-hall] (2018), would allow powering of larger devices, as illustrated herein but not limited to the collective surface area of 6,830 square centimeters. By connecting individual triboelectric units with copper, enhancing triboelectrically active material backing with graphene where the use of graphene which is 13 times more conductive than copper as shown in Sharma, K. R. Graphene materials. N.Y. 2014.pp 9, to conduct a larger amount of electricity from the triboelectric material of the embodiment to the copper strips, where the copper strips connect the individual units and allow for connection to further consecutive units of the embodiment and subsequently to an energy storage unit.

BRIEF SUMMARY OF INVENTION

The objective of this invention is to provide a workable, stable, and greater source of electricity for the charging of larger devices by graphene enhancement, increased surface area of triboelectric materials, and use of long-lasting frame and suspension materials i.e. rare-earth metal magnets and planks. Further objectives, novelty, and advantages of the invention will be elucidated within the following description.

DETAILED DESCRIPTION OF THE INVENTION

Figure 1:
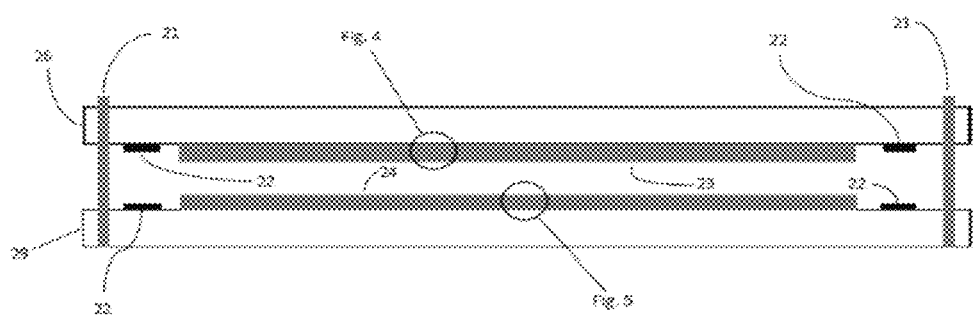
FIG. 1 Depicts the front view of the invention.

Referring to FIG. 1, FIG. 1 shows the front view of the embodiment where 21 depicts two wood rods for stabilizing the opposing planks 26 and 29. Opposing neodymium magnets 22 with same pole facing each other for suspension and allowance of compression from foot-traffic and allowing the top planks 26 to return to their initial position due to magnetic repulsion. Opposed charge triboelectric strips pads 23 and 24 are exactly aligned and reinforced by the planks for evenly distributed surface interaction for optimal electricity production.

Figure 2:
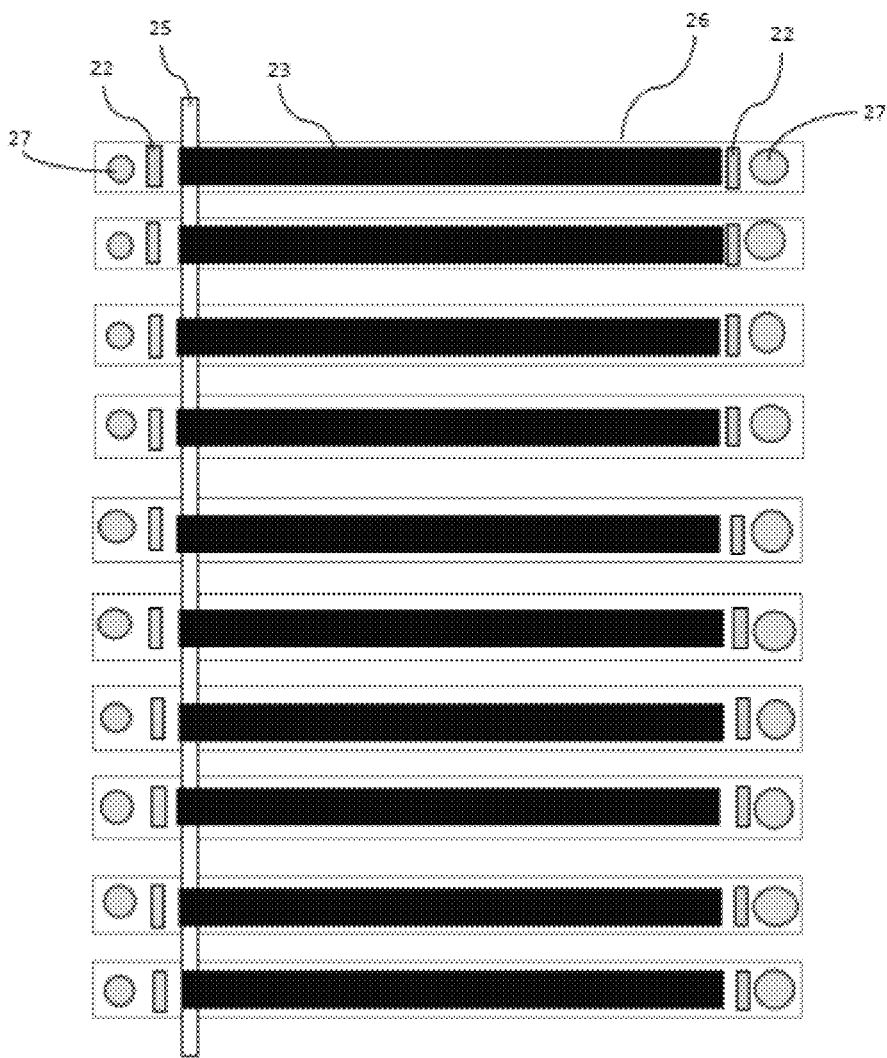
FIG. 2 shows the under view of one side of the assembled connected individual plank units.

Referring to FIG. 2, FIG. 2 illustrates the assembled portion of the embodiment where 25 depicts a strip of copper to distribute the electricity created from compression opposed surface interaction produced by foot-traffic connecting the individual triboelectric pads 23 which have the dimensions of 84 centimeters by 7.62 centimeters or 638.7 square centimeters as embodied, attached by adhesive to the planks 26 with dimensions 121.92 centimeters by 10.16 centimeters or 1,238.71 square centimeters. The Neodymium magnets 22, adhered by adhesive to the inside of the planks, for suspension of the planks. Further, 27 depicts holes on side of the planks 26 to accept the wood pegs 21 that stabilize and connect the planks 26.

Figure 3:
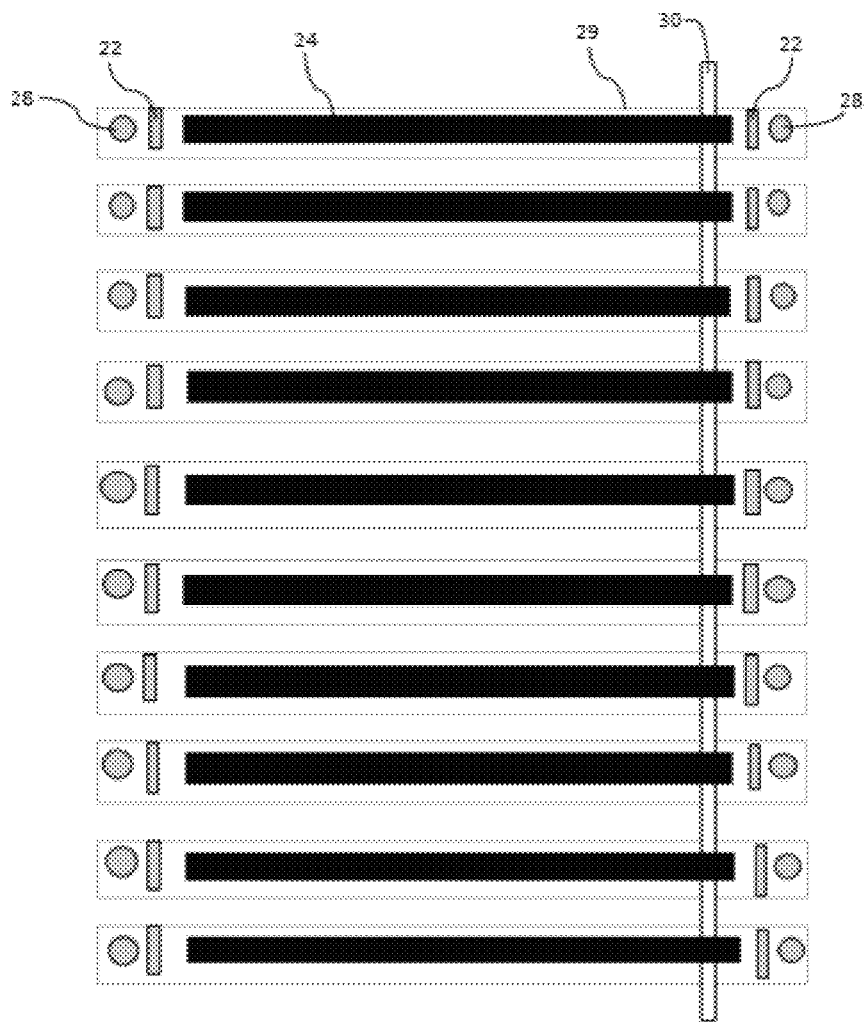
FIG. 3 depicts the under side of the opposing assembled connected individual plank units.

Regarding FIG. 3, FIG. 3 represent the opposing and mirrored assembled portion of the embodiment. Holes 28 in the planks 29 are to accept the wooden pegs 21 to connect and stabilize the planks 29. The neodymium magnets 22, adhered by adhesive to the inside of the planks 29, for suspension of the planks. The planks 29 have the dimensions of 121.92 centimeters by 10.16 centimeters or 1,238.71 square centimeters where the opposing triboelectric pads 24 are attached by adhesive with the dimensions 84 centimeters by 7.62 centimeters or 638.7 square centimeters which are connected by a copper strip 30 for completing the circuit as shown in FIG. 3.

Figure 4:
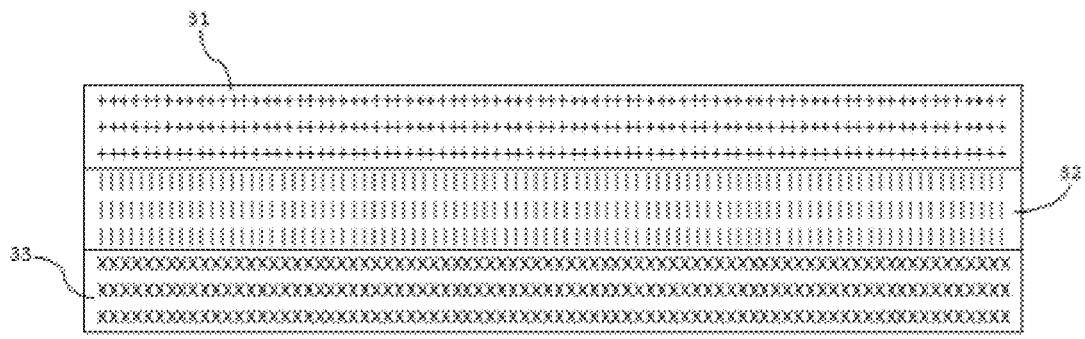
FIG. 4 gives a representation of the positively charged triboelectric pads in addition to the layering of the materials.

Referring to FIG. 4. 31 depicts the positive triboelectric pads material which is adhered to adhesive graphene covered tape 32 to conduct the electricity produced from compression of by foot-traffic to the copper strip 25 33 depicts an extender, which is adhered to both 32 of FIG. 4 and the plank 26, that raises the triboelectric pad 31 slightly above the neodymium magnets 22.

Figure 5:
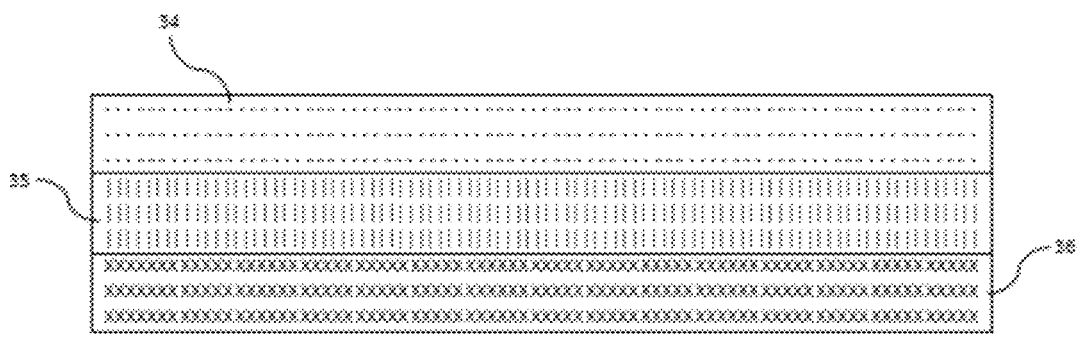
FIG. 5 represents the negatively charged triboelectric pads as well as the layering of the materials.

Referring to FIG. 5.

34 of FIG. 5 illustrates the negative triboelectric pads materials which is adhered to the adhesive graphene covered tape 35, to conduct the electricity produced from compression of by foot-traffic to the copper strip 30. 36 of FIG. 5 depicts an extender, which is adhered to both adhesive graphene covered tape 35, and the plank 29, that raises the triboelectric pad 34 slightly above the neodymium magnets 22 allowing the planks to compress and return to its original levitated position as shown in U.S. Pat. No. 5,825,105.

The invention claimed is:

1. A Graphene-material Triboelectric Footpath Electricity Generator, with Planks Suspended by Rare-Earth Metal Magnets, comprising:

a first plank plurality, adhered on the first plank plurality is a first triboelectric pad plurality connected by a first copper strip, each of the first triboelectric pads comprises a graphene covered tape adhered to an extender;

a second plank plurality, adhered on the second plank plurality is a second triboelectric pad plurality connected by a second copper strip, each of the second triboelectric pads comprises a graphene covered tape adhered to an extender;

a first hole disposed on a first side of each of the first and second plank pluralities for accepting wood pegs; a second hole disposed on a second side of each of the first and second plank pluralities for accepting wood pegs:

a first Rare-earth magnets disposed on the first side of the first and second planks, proximate to the first and second triboelectric pad pluralities, a second rare-earth metal magnets disposed on the second side of the first and second planks, proximate to the first and second triboelectric pad pluralities;

Wherein the first and second rare-earth metal magnets are aligned for magnetic repulsion to allow suspension and compression of the first and second plank pluralities, the first and second plank pluralities are stabilized by the wood pegs, Wherein the allowance of suspension and compression of the first and second plank pluralities causes the first and second triboelectric pad pluralities to electrically interact, allowing for triboelectric production of electricity from a foot-traffic on the first or second plank pluralities, Wherein the graphene covered tape of the first and second triboelectric pad pluralities conduct the produced electricity to the copper strips.

* * * * *